United States Patent
Kim

(10) Patent No.: US 7,433,106 B2
(45) Date of Patent: Oct. 7, 2008

(54) MIRROR SUPPORT DEVICE AND OPTICAL SCANNING APPARATUS ADOPTING THE SAME

(75) Inventor: Jung-kwon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 11/213,762

(22) Filed: Aug. 30, 2005

(65) Prior Publication Data

US 2006/0132879 A1 Jun. 22, 2006

(30) Foreign Application Priority Data

Dec. 18, 2004 (KR) .................. 10-2004-0108401

(51) Int. Cl.
 *G02B 26/08* (2006.01)
(52) U.S. Cl. ..................... 359/196; 359/872
(58) Field of Classification Search ................ 359/196, 359/198, 212–214, 871, 872, 223–226
 See application file for complete search history.

(56) References Cited

U.S. PATENT DOCUMENTS 6,676,267 B2 * 1/2004 Takase ................ 359/872

2003/0137708 A1 7/2003 Takase

FOREIGN PATENT DOCUMENTS

| JP | 61-160711 | 7/1986 |
| JP | 63-129310 | 6/1988 |
| JP | 04-98013 | 3/1992 |
| JP | 10-170846 | 6/1998 |
| JP | 2000-221588 | 8/2000 |
| JP | 2002-244018 | 8/2002 |
| JP | 2003-262781 | 9/2003 |

OTHER PUBLICATIONS

Korean Office Action dated Mar. 30, 2006 issued in KR 2004-108401.

* cited by examiner

*Primary Examiner*—Euncha P Cherry
(74) *Attorney, Agent, or Firm*—Stanzione & Kim, LLP

(57) ABSTRACT

In a mirror support device and an optical scanning apparatus adopting the same, a mirror is installed in a holder, an elastic clasp elastically urges the mirror toward a vertical wall of the holder, and a mirror aligning part is arranged at the vertical wall with a predetermined pattern to push the mirror at a plurality of points to adjust the orientation of the mirror. Accordingly, the mirror can be easily oriented to left and right directions as well as up and down directions.

25 Claims, 12 Drawing Sheets

FIG. 1 (PRIOR ART)
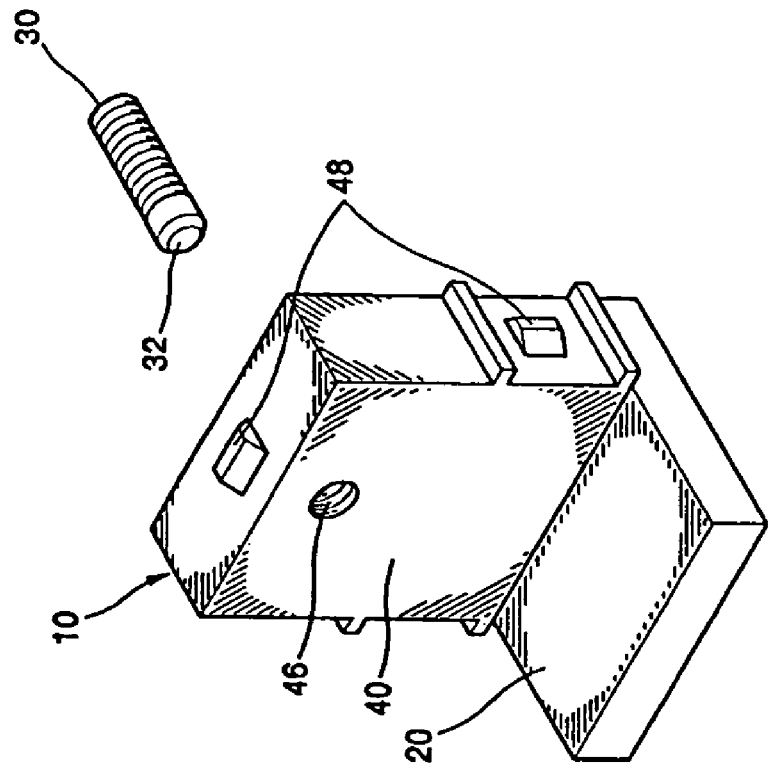
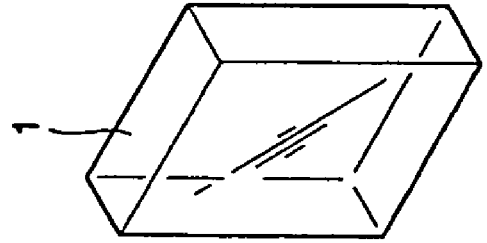
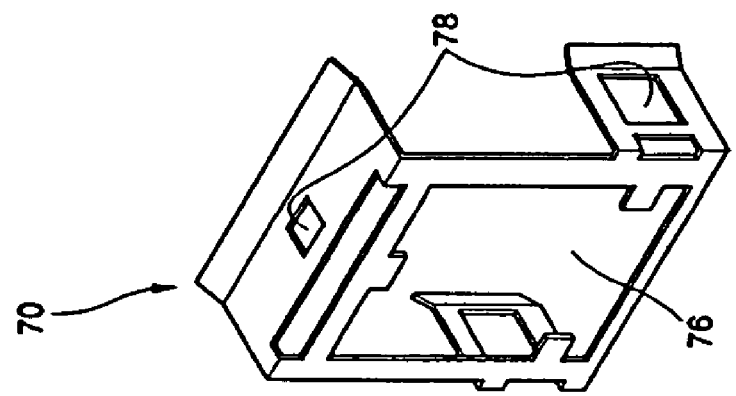

MIRROR SUPPORT DEVICE AND OPTICAL SCANNING APPARATUS ADOPTING THE SAME

CROSS-REFERENCE TO RELATED APPLICATIONS

This application claims the benefit of Korean Patent Application No. 10-2004-108401, filed on Dec. 18, 2004, in the Korean Intellectual Property Office, the disclosure of which is incorporated herein in its entirety by reference.

BACKGROUND OF THE INVENTION

1. Field of the Invention

The present general inventive concept relates to a mirror support device and optical scanning apparatus adopting the same, and more particularly, to a mirror support device which is capable of orienting a mirror toward left, right, up and down directions, and an optical scanning apparatus adopting the same.

2. Description of the Related Art

Optical scanning apparatuses, such as a laser scanning unit (LSU) are widely used in image forming devices and image reading devices, such as digital copiers, electrophotographic image forming apparatuses, facsimiles, and bar code readers. In an optical system, the optical scanning apparatus uses a mirror to direct light to a desired location. Therefore, the optical scanning apparatus is provided with a mirror support device for supporting the mirror and controlling the light directing.

FIG. 1 is an exploded perspective view illustrating a conventional mirror support device.

Referring to FIG. 1, the conventional mirror support device includes a mirror 1, a mounting part 10, an elastic clasp 70, and an aligning screw 30. The mounting part 10 includes a base 20 and a vertical wall 40. When assembled, the mirror 1 stands on the base 20 while facing the vertical wall 40.

The vertical wall 40 defines an aligning hole 46 through which the aligning screw 30 moves forward and backward to tilt the mirror 1 in forward and backward directions. The aligning screw 30 has a contact surface 32 at one end thereof. The contact surface 32 comes into contact with the mirror 1 when the aligning screw 30 moves the mirror 1. The vertical wall 40 includes three coupling protrusions 48 to fix the elastic clasp 70 thereto. The three coupling protrusions 48 are formed at the top and both sides of the vertical wall 40.

The elastic clasp 70 fastens the mirror 1 to the mounting part 10. The elastic clasp defines an opening 76 to expose the mirror 1. Also, the elastic clasp defines coupling holes 78 to which the coupling protrusions 48 are coupled when assembled.

To assemble the conventional mirror support device, the mirror 1 is placed on the base 20 to face the vertical wall 40, and then the elastic clasp 70 is fixed to the mounting part 10 by inserting the coupling protrusions 48 into the coupling holes 78. The mirror 1 in the mirror support device can be oriented to up and down directions by moving the aligning screw 30 forward and backward.

However, the mirror support device has a disadvantage in that the contact surface 32 can be improperly abutted against the mirror 1 when orienting the mirror to the up or down direction, causing the mirror 1 to be oriented to an undesired left or right direction. Further, the mirror support device is not suitable for orienting the mirror 1 to directions other than the up and down directions, such that it is inconvenient to align the mirror using the conventional mirror support device.

SUMMARY OF THE INVENTION

The present general inventive concept provides a mirror support device and an optical scanning apparatus adopting the same, in which left/right alignment and up/down alignment of a mirror can be independently carried out.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a mirror support device including a mirror having a mirror surface, a holder on which the mirror is mounted, the holder including a base on which the mirror stands and a vertical wall disposed at a side of the base to face the mirror, an elastic clasp to elastically urge the mirror toward the vertical wall, and a mirror aligning part arranged at the vertical wall with a predetermined pattern to push the mirror at a plurality of points to adjust an orientation of the mirror.

The mirror aligning part may include a first aligning portion and a second aligning portion that are horizontally arranged a predetermined distance apart from each other, and a third aligning portion spaced apart from the second aligning portion in a vertical direction.

Each of the first and third aligning portions may include an aligning hole defined through the vertical wall, and an aligning member movable in the aligning hole in forward and backward directions to adjust the orientation of the mirror.

The aligning hole may be a screw hole and the aligning member may be a male screw.

The second aligning portion may include a projection projecting toward the mirror to abut against the mirror.

The projection may be in point-contact with the mirror.

The projection may have a hemisphere shape.

The second aligning portion may include an aligning hole defined through the vertical wall, and an aligning member movable in the aligning hole in forward and backward directions to adjust the orientation of the mirror.

The elastic clasp may include a mirror pressing part disposed corresponding to the mirror aligning part, the mirror pressing part having at least one protruding pressing portion to press the mirror toward the vertical wall.

The at least one pressing portion may include a first pressing portion aligned with an imaginary horizontal line connecting the first and second aligning portions to press the mirror toward the vertical wall, and a second pressing portion aligned with an imaginary vertical line connecting the second and third aligning portions to press the mirror toward the vertical wall.

The elastic clasp may be made of stainless steel.

The first and second aligning portions may be abutted against lower portions of the mirror, and the third aligning portion may be abutted against an upper portion of the mirror.

The first and second aligning portions may be abutted against upper portions of the mirror, and the third aligning portion may be abutted against a lower portion of the mirror.

The holder may include a plurality of coupling protrusions to couple with the elastic clasp.

The foregoing and/or other aspects of the present general inventive concept may also be achieved by providing an optical scanning apparatus including a mirror support device in which a mirror having a mirror surface is installed to reflect light to a predetermined location, the mirror support device including a holder on which the mirror is mounted, the holder having a base on which the mirror stands and a vertical wall disposed at a side of the base to face the mirror, an elastic clasp to elastically urge the mirror toward the vertical wall, and a mirror aligning part arranged at the vertical wall with a predetermined pattern to push the mirror at a plurality of points to adjust an orientation of the mirror.

The mirror aligning part may include a first aligning portion and a second aligning portion that are horizontally arranged a predetermined distance apart from each other, and a third aligning portion spaced apart from the second aligning portion in a vertical direction.

Each of the first and third aligning portions may include an aligning hole defined through the vertical wall, and an aligning member movable in the aligning hole in forward and backward directions to adjust the orientation of the mirror.

The second aligning portion may include a projection projecting toward the mirror to abut against the mirror.

The elastic clasp may include a mirror pressing part disposed corresponding to the mirror aligning part, the mirror pressing part having at least one protruding pressing portion to press the mirror toward the vertical wall.

The at least one pressing portion may include a first pressing portion aligned with an imaginary horizontal line connecting the first and second aligning portions to press the mirror toward the vertical wall, and a second pressing portion aligned with an imaginary vertical line connecting the second and third aligning portions to press the mirror toward the vertical wall.

The first and second aligning portions may be abutted against lower portions of the mirror, the third aligning portion may be abutted against an upper portion of the mirror, and the holder may include a plurality of coupling protrusions to couple with the elastic clasp.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 1 is an exploded perspective view illustrating a conventional mirror support device;

DETAILED DESCRIPTION OF THE PREFERRED EMBODIMENTS

Figure 2:
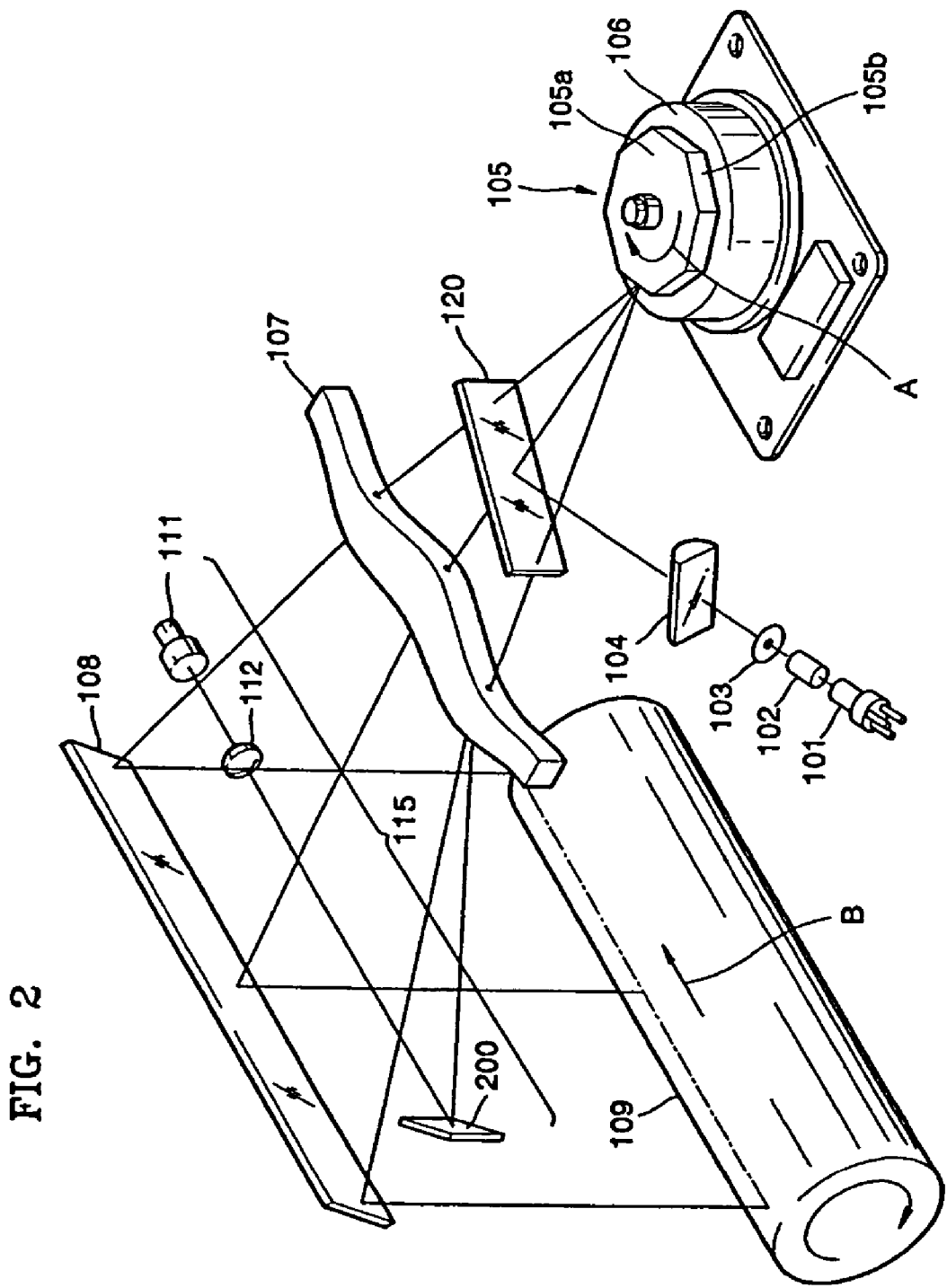
FIG. 2 is a schematic view illustrating an optical system of an optical scanning apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

An optical scanning apparatus with a mirror support device according to various embodiments of the present general inventive concept can be used with image forming devices and image reading devices, such as digital copiers, electrophotographic image forming apparatuses, facsimiles, and bar code readers. Hereinafter, a laser scanning unit (LSU), which can be used as an optical scanning apparatus with an electrophotographic image forming apparatus, will be exemplary illustrated to describe the present general inventive concept.

FIG. 2 is a schematic view illustrating an optical system of an optical scanning apparatus according to an embodiment of the present general inventive concept.

Referring to FIG. 2, the optical scanning apparatus scans light to a photoconductor 109 as the photoconductor 109 rotates. The optical scanning apparatus includes a light source 101, a collimator lens 102, a slit member 103, a cylinder lens 104, a beam splitter 120, a beam deflector 105, an fθ lens 107, an imaging mirror 108, and a sync detecting unit 115.

The light source 101 turns on/off under the control of a driving circuit to produce and scan at least one light beam corresponding to image data. The light source 101 may be a semiconductor laser diode or a light emitting diode (LED). The light source 101 can scan a single light beam or a multi light beam. Since the light source 101 is well known in the related art, detailed description thereof will be omitted for conciseness.

The collimator lens 102 is spaced apart from the light source 101 and collimates the light from the light source 101 to make the light parallel or converged. The slit member 103 is attached to an end of the collimator lens 102 to restrict the light passing therethrough. The cylinder lens 104 directs the light from the slit member 103 toward the beam splitter 120 linearly.

The beam splitter 120 is disposed between the beam deflector 105 and the fθ lens 107 and defines a horizontal plane together with the beam deflector 105 and the fθ lens 107. The beam splitter 120 transmits a portion of the light from the cylinder lens 104 and reflects a remaining portion of the light from the cylinder lens 104. The beam splitter 120 may be a half mirror to transmit half of incident light.

The beam deflector 105 deflects the light reflected from the beam splitter 120 and rotates to scan the light along a predetermined path with a constant linear velocity. The light reflected from the beams splitter 120 and incident on the beam deflector 105 is nearly parallel to the light deflected from the beam deflector 105. When the beam deflector 105 rotates in the direction of an arrow (A) of FIG. 2, the light is scanned along the photoconductor 109 in the direction of an arrow (B)

of FIG. 2 to form a latent image on the photoconductor 109. The beam deflector 105 may be a polygon mirror device, as illustrated in FIG. 2. The polygon mirror device can include a polygon mirror 105a and a driving unit 106. The polygon mirror 105a is rotatably mounted on the driving unit 106, and the driving unit 106 rotates the polygon mirror 105a clockwise or counterclockwise at a predetermined speed. The polygon mirror 105a has a plurality of mirror surfaces 105b at sides thereof to deflect incident light. Alternatively, other types of beam deflectors, such as a hologram disc type beam deflector and a galvanometer type beam deflector, may be used as the beam deflector 105.

The fθ lens 107 is disposed on an optical path between the beam deflector 105 and the imaging mirror 108. The fθ lens 107 can include one or more lenses. The fθ lens 107 directs the light deflected from the beam deflector 105 toward the photoconductor 109 in main and sub scanning directions with different magnifications. The main scanning direction is an axial direction of the photoconductor 109 (the direction of the arrow "B"). That is, the main scanning direction is the direction along which the beam deflector 105 deflects the light. The sub scanning direction is a rotating direction of the photoconductor 109. The fθ lens 107 may be plastic molded to increase productivity and decrease cost.

The imaging mirror 108 reflects the light from the fθ lens 107 to the surface of the photoconductor 109 to form a latent image. The imaging mirror 108 is inclined at an angle to reflect the light to the surface of the photoconductor 109 at a right angle. That is, the light is scanned to the photoconductor 109 in a direction perpendicular to the sub scanning direction.

The sync detecting unit 115 detects the light emitted from the light source 101 to adjust a horizontal synchronization of the light. The sync detecting unit 115 includes a mirror 200, a condenser lens 112, and a sync sensor 111. The mirror 200 is disposed between the fθ lens 107 and the condenser lens 112 to reflect some of the light from the fθ lens 107 toward the condenser lens 112. The condenser lens 112 focuses the light from the mirror 200 to the sync sensor 111.

The mirror 200 may be mounted on a mirror support device according to various embodiments of the present general inventive concept.

Operations of the optical scanning apparatus of FIG. 2 will now be described according to an embodiment of the present general inventive concept.

The beam splitter 120 is disposed between the fθ lens 107 and the beam deflector 105. The light source 101 turns on/off under the control of the driving circuit to produce and scan at least one light beam corresponding to the image data. The light emitted from the light source 101 passes through the collimator lens 102, the slit member 103, and the cylinder lens 104. The portion of the light from the cylinder lens 104 transmitted through the beam splitter 120 is directed toward the imaging mirror 108 through the fθ lens 107. The remaining portion of the light from the cylinder lens 104 is reflected by the beam splitter 120 toward the beam deflector 150. The beam deflector 105 deflects the light toward the imaging mirror 108 through the fθ lens 107, and the imaging mirror 108 directs the light toward the photoconductor 109 to form the latent image. The sync sensor 111 detects the light passing through the fθ lens 107 to adjust horizontal synchronization of the light. The mirror 200 mounted on the mirror support device reflects some of the light from the fθ lens 107 toward the condenser lens 112.

Figure 3:
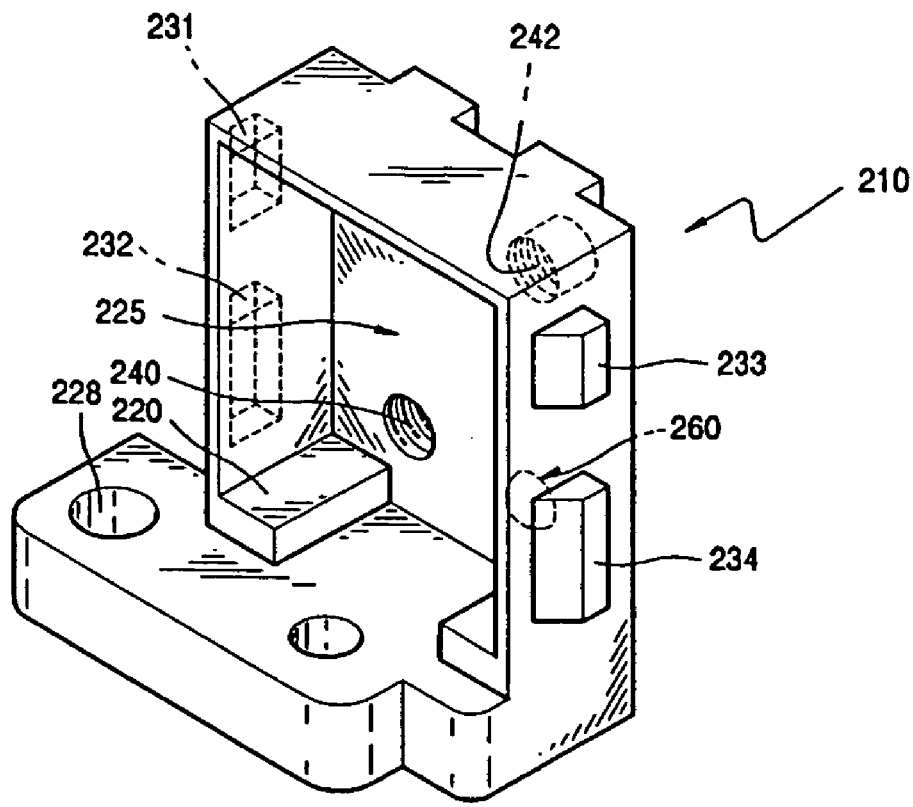
FIG. 3 is a perspective view illustrating a holder of a mirror support device according to an embodiment of the present general inventive concept.
Figure 4:
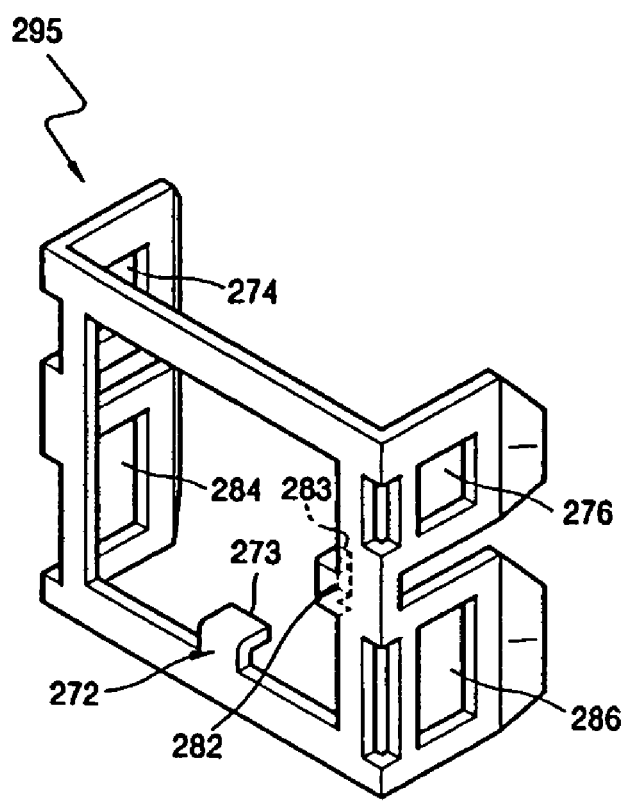
FIG. 4 is a perspective view illustrating an elastic clasp of a mirror support device according to an embodiment of the present general inventive concept.
Figure 5:
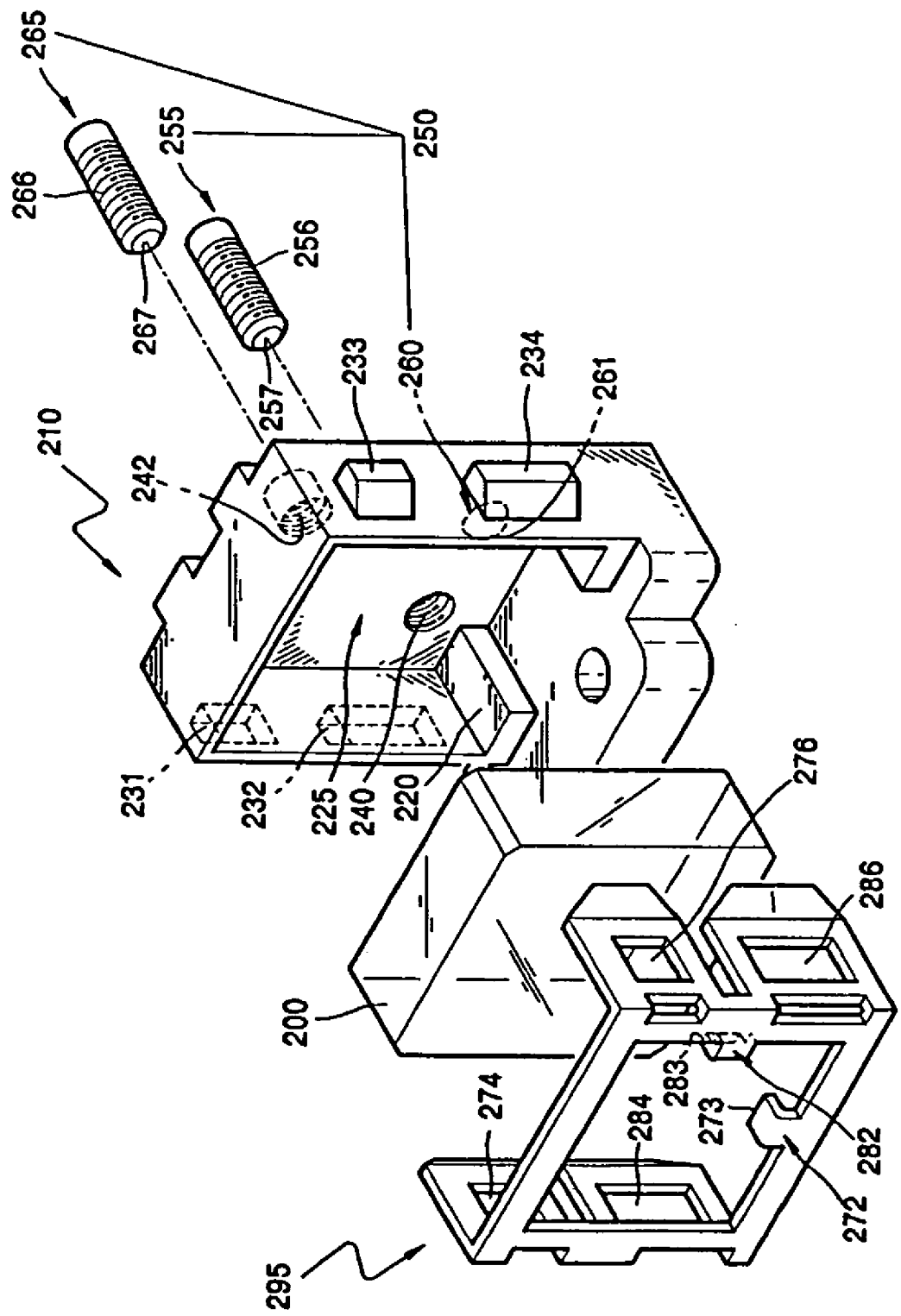
FIG. 5 is an exploded perspective view illustrating a mirror support device according to an embodiment of the present general inventive concept.
Figure 6:
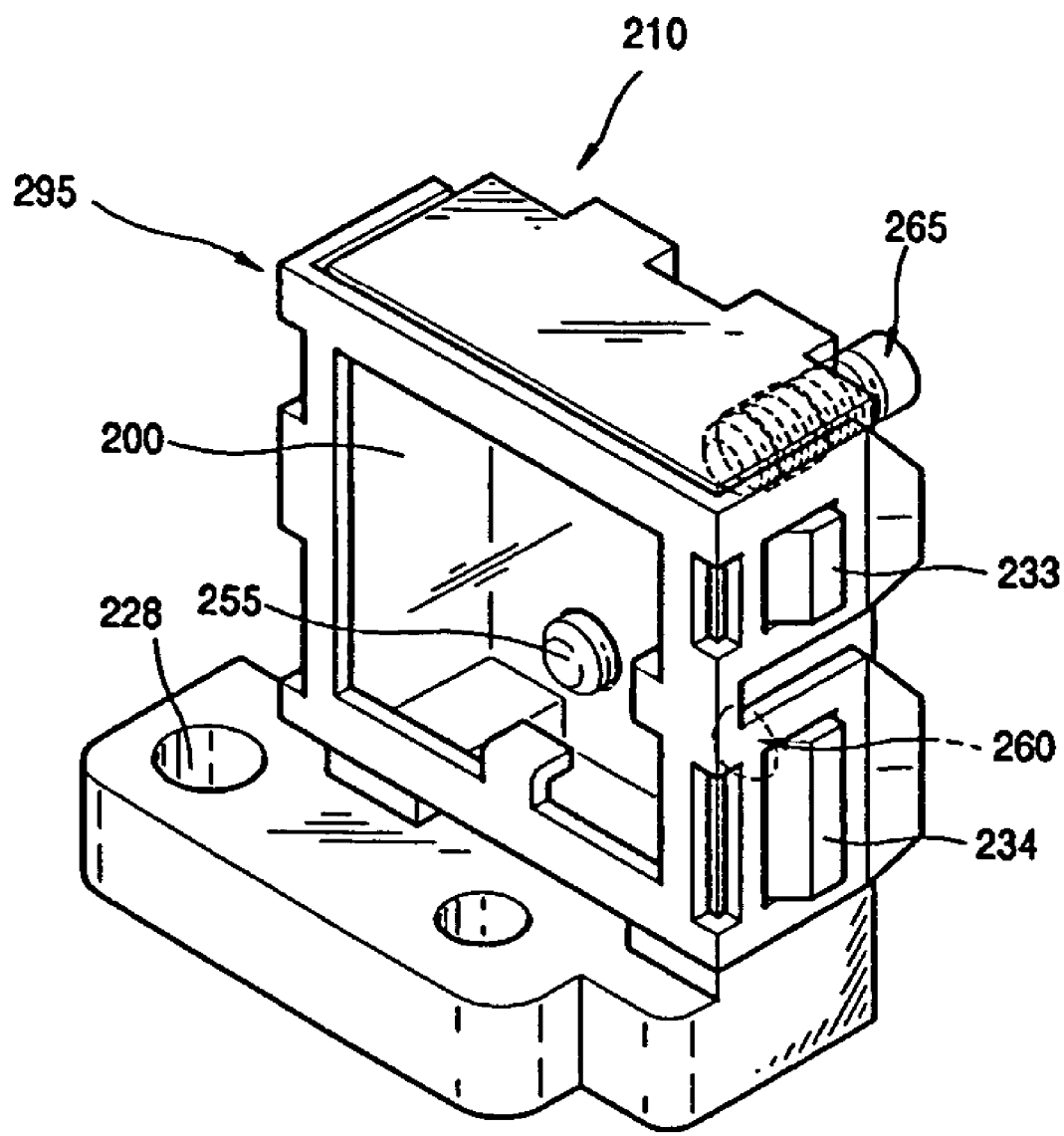
FIG. 6 is an assembled perspective view illustrating the mirror support device of FIG. 5.

FIG. 5 is an exploded perspective view illustrating the mirror support device according to an embodiment of the present general inventive concept. FIG. 6 is an assembled perspective view illustrating the mirror support device of FIG. 5. FIGS. 3 and 4 are perspective views illustrating a holder and an elastic clasp of the mirror support device of FIG. 5.

Referring to FIGS. 3-6, the mirror support device includes a mirror 200 to reflect incident light, a holder 210, an elastic clasp 295, and a mirror aligning part 250.

The holder 210 includes a base 220 to support the mirror 200 and a vertical wall 225 disposed at a side of the base 220 to face the mirror 200. The vertical wall 225 can be perpendicular to the base 220.

A guide hole 228 can be formed through the base 220. The guide hole 228 can be used to adjust a horizontal rotation of the holder 210. A pin (not shown) can be inserted into the guide hole 228 when the holder 210 needs to be rotated by a large amount. Also, a worm (not shown) may be installed on the bottom of the base 220 to adjust the horizontal rotation of the holder 210. The worm may be used with a worm gear (worm wheel, not shown). This worm gearset (i.e., the worm and the worm gear) is suitable to rotate a mirror of a high-sensitive optical device because of a smooth rotational structure and a large speed reduction ratio thereof. The worm gearset can be employed to rotate the holder 210 according to another embodiment of the present general inventive concept. Therefore, it is apparent that the employment of the worm gearset does not limit the spirit and scope of the present general inventive concept.

The mirror aligning part 250 is arranged at the vertical wall 225 with a predetermined pattern. The mirror aligning part 250 contacts the mirror 200 at a plurality of points to adjust an orientation of the mirror 200. There may be two, three, or four contact points between the mirror 200 and the mirror aligning part 250 (three are shown), but the present general inventive concept is not limited thereto. The mirror aligning part 250 can be used to move the mirror 200 to or from the elastic clasp 295 to adjust the orientation of the mirror 200.

The mirror aligning part 250 may include a first aligning portion 255, a second aligning portion 260, and a third aligning portion 265 that are arranged at the vertical wall 225 with a predetermined distance therebetween to tilt or swivel the mirror 200 to adjust the orientation of the mirror 200. Here, the term "aligning (align, alignment)" is used to denote an adjusting the orientation of the mirror 200 to reflect an incident light toward a predetermined location. Also, the aligning of the mirror 200 may include tilting (vertical rotation) and swiveling (horizontal rotation) the mirror 200.

The first and second aligning portions 255 and 260 can be horizontally arranged at the vertical wall 225 with a predetermined distance therebetween. That is, an imaginary line connecting the first and second aligning portions 255 and 260 is parallel with the base 220. The third aligning portion 265 can be spaced apart from the second aligning portion 260 in a vertical direction. That is, the first, second, and third aligning portions 255, 260, and 265 are arranged in a "⊤"-shaped or "⌐"-shaped pattern.

The first and third aligning portions 255 and 265 may respectively include aligning holes 240 and 242, and aligning members 256 and 266. The aligning holes 240 and 242 are formed through the vertical wall 225. The aligning members 256 and 266 are respectively installed in the aligning holes 240 and 242, and they are movable in forward and backward directions within the respective aligning holes 240 and 242. The aligning members 256 and 266 can be moved forward or backward to adjust the orientation of the mirror 200. The aligning members 256 and 266 can respectively include contact surfaces 257 and 267 at ends thereof. The contact surfaces 257 and 267 contact the mirror 200. When the aligning members 256 and 266 are moved, forces are applied to the mirror 200 from the contact surfaces 257, 267 to tilt and swivel the mirror 200. The aligning holes 240 and 242 may be screw holes, and the aligning members 256 and 266 may be screws.

The second aligning portion 260 can include a projection 261 projecting toward the mirror 200. The projection 261 may protrude from the vertical wall 255. The projection 261 may have a cylindrical shape or a box shape, or may be any other shape allowing a point contact with the mirror 220. When the first and third aligning portions 255 and 265 push the mirror 200, the mirror 200 swivels and tilts about the projection 261 of the second aligning portion 260, respectively. To tilt and swivel mirror 200 smoothly, the projection 261 may have a hemisphere shape as illustrated in FIGS. 3, 5, and 6.

As illustrated in FIGS. 3, 5, and 6, the second aligning portion 260 includes the projection 261. However, the second aligning portion can be designed to have another structure without departing from the spirit and scope of the present general inventive concept. For example, the second aligning portion can be designed to have an aligning hole and an aligning member similar to the first and third aligning portions 255 and 265 according to another embodiment of the present general inventive concept.

The first and second aligning portions 255 and 260 may be disposed at lower portions of the vertical wall 225 to abut against lower portions of the mirror 200, and the third aligning portion 265 may be disposed at an upper portion of the vertical wall 225 to abut against an upper portion of the mirror 200. Alternatively, the first and second aligning portions 255 and 260 may be disposed at upper portions of the vertical wall 225 to abut against upper portions of the mirror 200, and the third aligning portion 265 may be disposed at a lower portion of the vertical wall 225 to abut against a lower portion of the mirror 200. Although the mirror aligning part 250 is illustrated in FIG. 5 as having three aligning portions 255, 260, and 265, the aligning part 250 is not limited thereto, and may have a plurality of aligning portions. The number of aligning portions can be changed according to various embodiments of the present general inventive concept and does not limit the spirit and scope of the present general inventive concept.

The holder 210 can include a plurality of coupling protrusions 231, 232, 233, and 234 at opposite sides thereof to couple with the elastic clasp 295.

The elastic clasp 295 attaches to the holder 210 at locations corresponding to the coupling protrusions 231, 232, 233, and 234. The elastic clasp 295 elastically fastens the mirror to the holder 210. The elastic clasp 295 includes at least one protruding pressing portion to press the mirror 200 toward the vertical wall 225 from a position corresponding to the aligning portions 255, 260, 265 of the mirror aligning part 250. That is, the location of the pressing portion of the elastic clasp 295 is designed such that the force acting from the pressing portion is harmonized with opposing forces acting from the aligning portions 255, 260, 265 of the mirror aligning part 250.

The elastic clasp 295 may include a first pressing portion 272 and a second pressing portion 282 that are ⌐-shaped. The first and second pressing portions 272 and 282 respectively include contact surfaces 273 and 283 at ends thereof. The contact surfaces 273 and 283 contact the mirror 200 to press the mirror 200 toward the vertical wall 225. The first pressing portion 272 may be aligned with a first imaginary line connecting the first and second aligning portions 255 and 260. That is, the first pressing portion 272 presses a first side of the mirror 200, and the first and second aligning portions 255 and 260 press a second side of the mirror 200. The second pressing portion 282 may be aligned with a second imaginary line connecting the second and third aligning portions 260 and 265. That is, the second pressing portion 282 presses the first side of the mirror 200, and the second and third aligning portions 260 and 265 press the second side of the mirror 200. The elastic clasp 295 may be a leaf spring made of stainless steel. The elastic clasp 295 may be a leaf spring made of STS301 stainless steel in Korea Standard (KS). The STS301 stainless steel corresponds with AISI301 stainless steel in America Iron and Steel Institute standard.

A plurality of coupling holes 274, 284, 276, and 286 can be formed in the elastic clasp 295. The coupling holes 274, 284, 276, and 286 can couple with the coupling protrusions 231, 232, 233, and 234 of the holder 210. Though the number of the coupling holes is not critical, four coupling holes 274, 284, 276, and 286 can be used to attach the elastic clasp 295 to the holder 210 stably and securely. Although FIGS. 4-6 illustrate four coupling holes 274, 284, 276, and 286, the present general inventive concept is not limited thereto.

Figure 7:
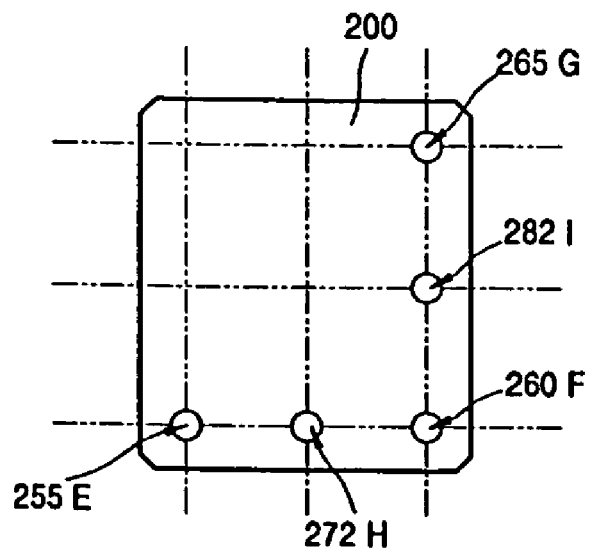
FIG. 7 is a view illustrating points of application of force of a mirror of the mirror support device of FIG. 5.
Figure 8:
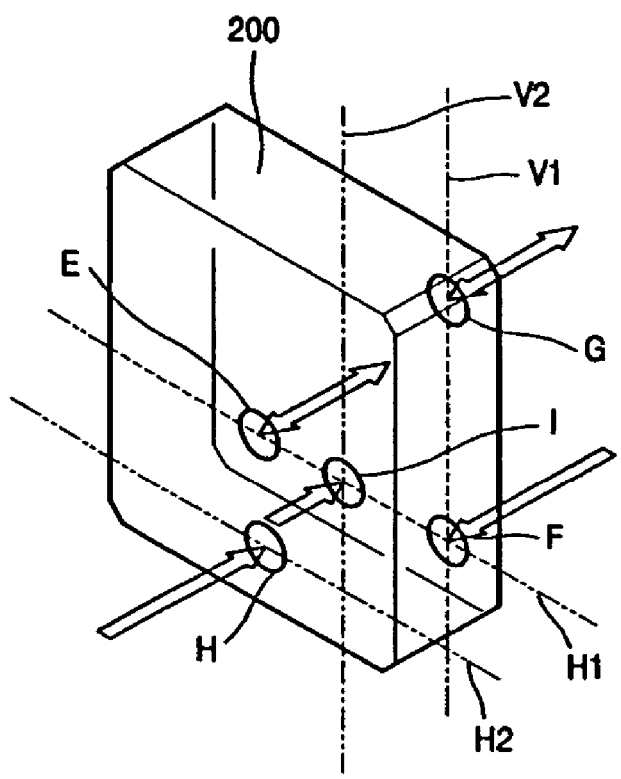
FIG. 8 is a perspective view illustrating forces acting on the mirror of the mirror support device of FIG. 5 when an orientation of the mirror is being adjusted.

FIGS. 7 and 8 illustrate points at which forces are applied to the mirror 200. Reference characters (E), (F), (G), (H), and (I) denote points on which forces are applied to the mirror 200 by the first aligning portion 255, the second aligning portion 260, the third aligning portion 265, the first pressing portion 272, and the second pressing portion 282, respectively. Also, reference character (H1) denotes an imaginary horizontal line on the second side of the mirror 200 connecting the first and second aligning portions 255 and 260. Reference character (V1) denotes an imaginary vertical line on the second side of the mirror 200 connecting the second and third aligning portions 260 and 265. Reference character (H2) denotes an imaginary horizontal line on the first side of the mirror 200 corresponding to the line (H1). Reference character (V2) denotes an imaginary vertical line on the first side of the mirror 200 corresponding to the line (V1).

Referring to FIGS. 6 through 8, the elastic clasp 295 is coupled to the holder 210 to fasten the mirror 200 to the holder 210 in such a manner that the coupling holes 274, 284, 276, and 286 are respectively coupled with the coupling protrusions 231, 232, 233, and 234. The first and second pressing portions 272 and 282 of the elastic clasp 295 are respectively abutted on the points (H) and (I) on the first side of the mirror 200 to urge the mirror 200 toward the vertical wall 225 of the holder 210. The first, second, and third aligning portions 255, 260, and 265 are abutted on the points (E), (F), and (G) on the second side of the mirror 200 to react against the forces of the first and second pressing portions 272 and 282 acting on the points (H) and (I). Here, the first aligning portion 255 or the third aligning portion 265 can be moved forward and backward to tilt or swivel the mirror 200 about the second aligning portion 260, respectively, to adjust the orientation of the mirror 200. Since the points (H) and (I) are respectively disposed on the lines (H2) and (V2), the first and third aligning portions 255 and 265 can be independently manipulated to adjust the orientation of the mirror 200.

As described above, the mirror support device according to the embodiment of FIGS. 3-6 is designed to independently point the mirror toward left, right, up, and down directions, such that a light beam can be directed to a desired location in an optical system having a long optical path.

Figure 9:
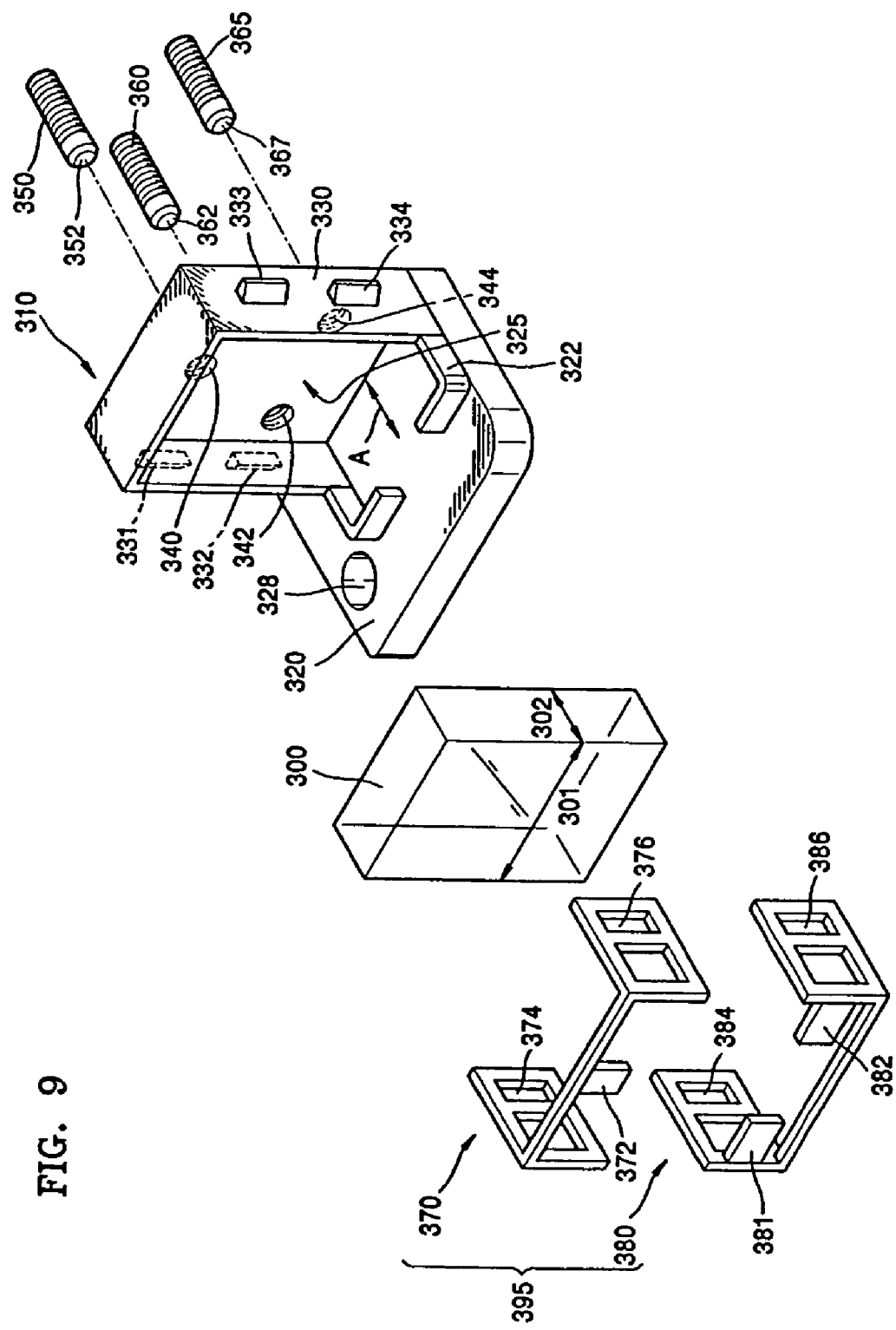
FIG. 9 is an exploded perspective view illustrating a mirror support device according to another embodiment of the present general inventive concept.
Figure 10:
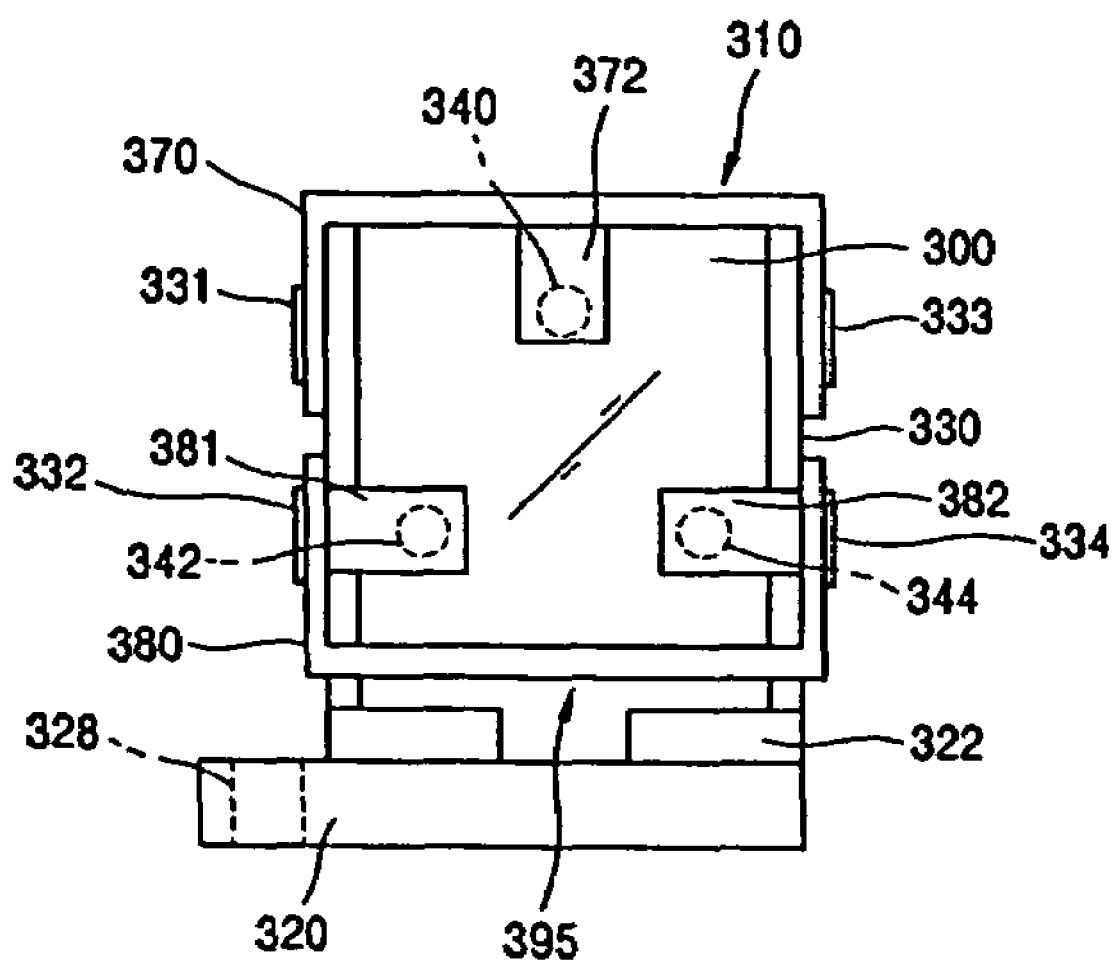
FIG. 10 is an assembled front view illustrating the mirror support device of FIG. 9.

FIG. 9 is an exploded perspective view illustrating a mirror support device according to another embodiment of the present general inventive concept and FIG. 10 is an assembled front view of the mirror support device of FIG. 9.

Referring to FIGS. 9 and 10, the mirror support device includes a mirror 300, a holder 310, an elastic clasp 395, and a mirror aligning part.

The mirror 300 reflects an incident light. The mirror 300 includes a length 301 and a width 302. The holder 310 includes a base 320 to support the mirror 300 and a vertical wall 330 disposed at a side of the base 320 to face the mirror 300.

The base 320 includes guides 322 with predetermined heights to confine a movement of a lower portion of the mirror 300 within a predetermined range. The guides 322 may be located such that a distance between the vertical wall 330 and the guides 322 is larger than the width 302 of the mirror 300, and a distance between the guides 322 is substantially equal to the length 302 of the mirror 300. Therefore, the guides 322 can confine forward and backward movements (denoted by arrow "A") of the mirror 300.

Figure 11:
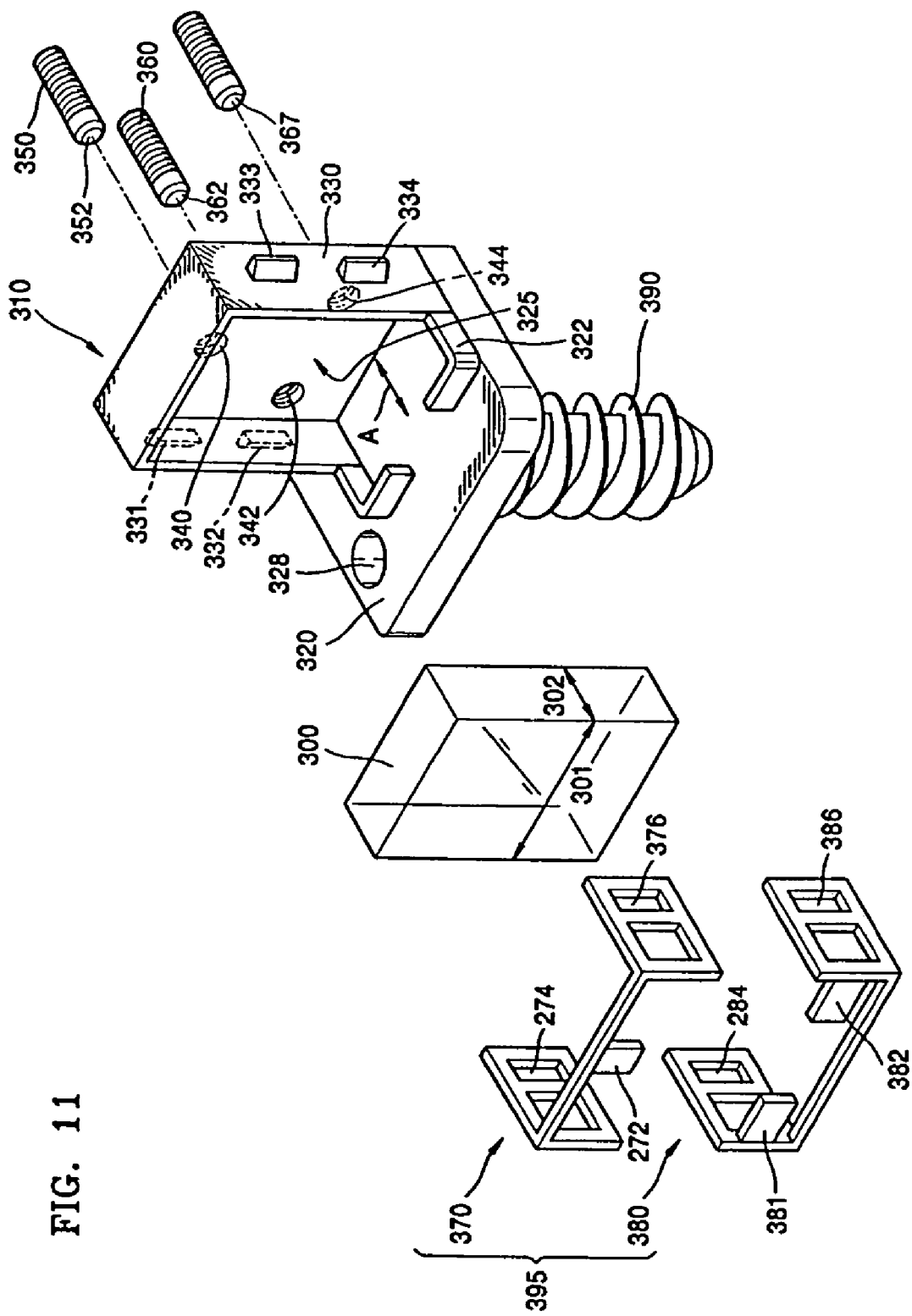
FIG. 11 is an exploded perspective view illustrating a mirror support device according to another embodiment of the present general inventive concept.

A guide hole 328 can be formed through the base 320. The guide hole 328 can be used to adjust a horizontal rotation of the holder 310. A pin (not shown) can be inserted into the guide hole 328 when the holder 310 needs to be rotated by a large amount. Also, a worm 390 (see FIG. 11) may be installed on the bottom of the base 320 to adjust the horizontal rotation of the holder 310. FIG. 11 illustrates a mirror support device employing the worm 390 according to another embodiment of the present general inventive concept. The mirror support device of FIG. 11 is substantially similar to the mirror support device of FIG. 10 except for the worm 390. The worm 390 may be used with a worm gear (worm wheel, not shown). This worm gearset (i.e. the worm 390 and the worm gear) is suitable to rotate a mirror of a high-sensitive optical device because of a smooth rotational structure and a large speed reduction ratio thereof. The employment of the worm gearset, according to the embodiment of FIG. 11 does not limit the spirit and scope of the present general inventive concept.

The mirror aligning part is arranged at the vertical wall 330 with a predetermined pattern. The mirror aligning part contacts the mirror 300 at a plurality of points to adjust an orientation of the mirror 300. The mirror aligning part may include a first aligning member 350, a second aligning member 360, and a third aligning member 365. The first aligning member 350 may be abutted at an upper portion of the mirror 300, and the second and third aligning members 360 and 365 may be abutted at lower portions of the mirror 300. The first aligning member 350 can be moved forward and backward to tilt the mirror 300 upward and downward to adjust the orientation of the mirror 300 in upward and downward directions. The second and third aligning members 360 and 365 can be used to swivel the mirror 300 to precisely adjust the orientation of the mirror in left and right directions. Although the embodiment of FIG. 9 illustrates the mirror aligning part including three aligning members 350, 360, and 365, a number of aligning members is not limited thereto.

The first, second, and third aligning members 350, 360, and 365 respectively include contact surfaces 352, 362, and 367 at ends thereof. The contact surfaces 352, 362, and 367 contact the mirror 300. When the first, second, and third aligning members 350, 360, and 365 are moved, forces are applied to the mirror 300 from the respective contact surfaces 352, 362, and 367 to tilt and swivel the mirror 300.

The vertical wall 330 includes a first aligning hole 340, a second aligning hole 342, and a third aligning hole 344 formed therein into which the first, second, and third aligning members 350, 360, and 365 can be respectively inserted.

Also, the vertical wall 330 can include a mirror receiving portion 325 with a predetermined height to accommodate the mirror 300. The movement of the mirror 300 is confined within the mirror receiving portion 325. The holder 310 includes a plurality of coupling protrusions 331, 332, 333, and 334 at both sides. The coupling protrusions 331, 332, 333, and 334 can be aligned with the elastic clasp 395.

The elastic clasp 395 can include a first elastic member 370 and a second elastic member 380 to elastically fasten the mirror 300 to the holder 310. The first elastic member 370 can include coupling holes 374 and 376 in which the coupling protrusions 331 and 333 can be inserted. The first elastic member 370 biases an upper portion of the mirror 300 toward the vertical wall 330 where the first aligning member 350 is located. The first elastic member 370 may include a first pressing portion 372 aligned with the first aligning member 350 to tightly fasten the mirror 300 against the first aligning member 350.

The second elastic member 380 can include coupling holes 384 and 386 in which the coupling protrusions 332 and 334 can be inserted. The second elastic member 380 biases a lower portion of the mirror 300 toward the vertical wall 330 where the second and third aligning members 360 and 365 are located. The second elastic member 380 may include second and third pressing portions 381 and 382 aligned with the second and third aligning members 360 and 365 to tightly fasten the mirror 300 against the second and third aligning members 360 and 365.

As illustrated in FIG. 9, two coupling holes 374, 376, 384, and 386 are provide in each of the first and second elastic members 370 and 380 to stably and securely fasten the mirror 300 to the holder 310, however, a number of coupling holes is not limited thereto.

The first and second elastic member 370 and 380 can be independently attached to the holder 310, such that the first and second elastic members 370 and 380 can independently react against the aligning actions of the first, second, and third aligning members 350, 360, and 365. The elastic clasp 395 may be a leaf spring.

When installing the mirror 300 into the mirror support device, the mirror 300 is inserted in the mirror receiving portion 325, the coupling holes 374 and 376 of the first elastic member 370 are coupled with the coupling protrusions 331 and 333 of the holder 310, and the coupling holes 384 and 386 of the second elastic member 380 are coupled with the coupling protrusions 332 and 334 of the holder 310. Moving the first aligning member 350 in forward and backward directions causes the mirror 300 to tilt downward and upward, respectively. That is, the mirror 300 tilts downward due to a force of the first aligning member 350 when the first aligning member 350 moves forward, and tilts upward due to a force of the first elastic member 370 when the first aligning member 350 moves backward, such that the orientation of the mirror 300 can be adjusted in upward and downward directions using the first aligning member 350. The first pressing portion 372 supports the mirror 300 against the forward and backward movements of the first aligning member 350, such that an undesired deviation of the mirror 300 can be prevented during the tilting movement of the mirror 300.

Moving the second and third aligning member 360 and 365 in forward and backward directions causes the mirror 300 to swivel right and left. That is, the mirror 300 swivels right and left as the second and third aligning members 360 and 365 move forward and backward, such that the orientation of the mirror 300 can be adjusted in right and left directions using the second and third aligning members 360 and 365. The second and third pressing portions 381 and 382 support the mirror 300 against the forward and backward movements of the second and third aligning members 360 and 365, such that an undesired deviation of the mirror 300 can be prevented during the swiveling movement of the mirror 300. When it is required to rotate the mirror 300 largely, the guide hole 328 can be used. As described above, the mirror support device according to the embodiment of FIGS. 9 and 10 is designed to precisely point the mirror 300 toward left, right, up, and down directions, such that a light beam can be directed to a desired location in an optical system with a long optical path.

Figure 12:
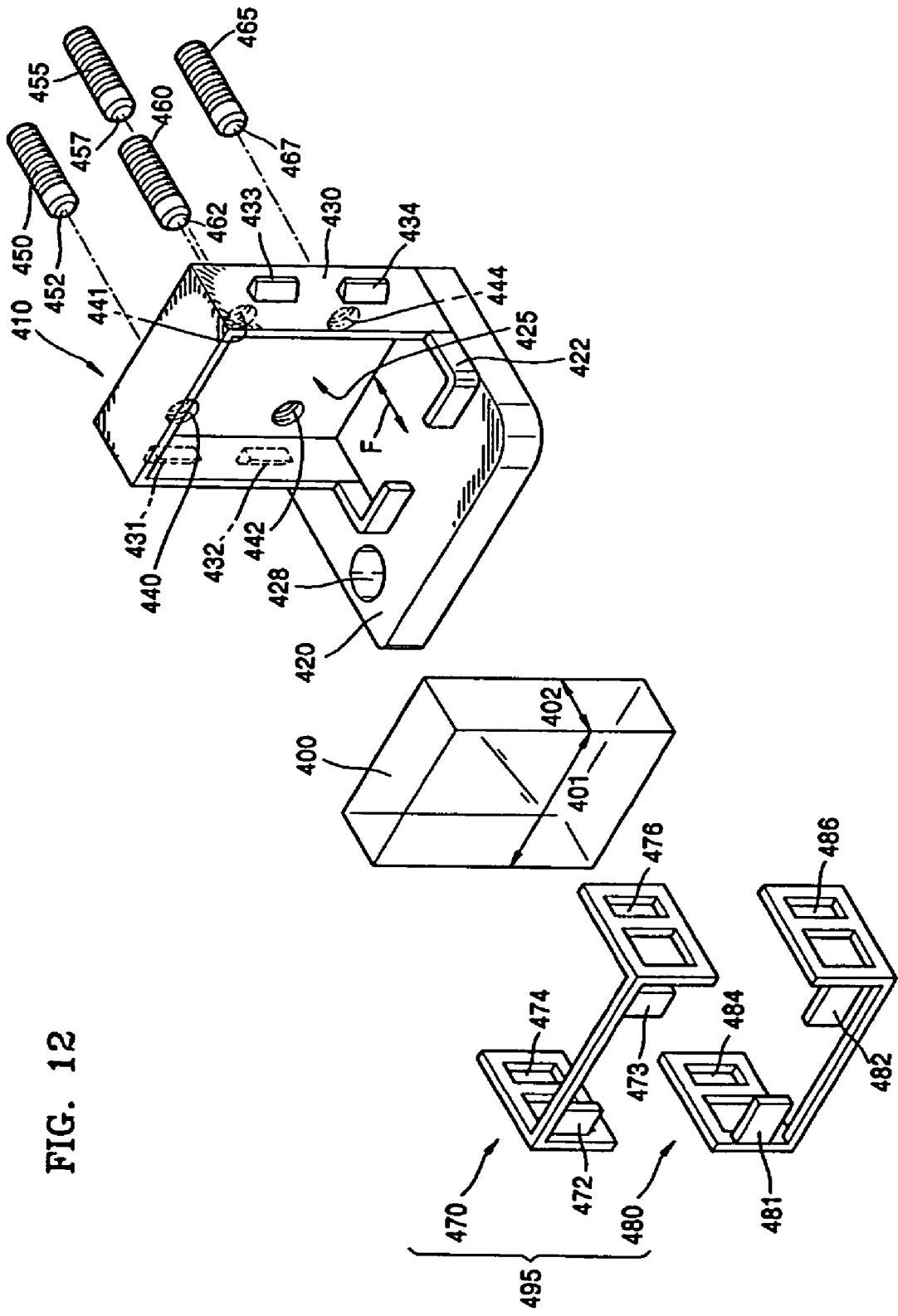
FIG. 12 is an exploded perspective view illustrating a mirror support device according to another embodiment of the present general inventive concept.
Figure 13:
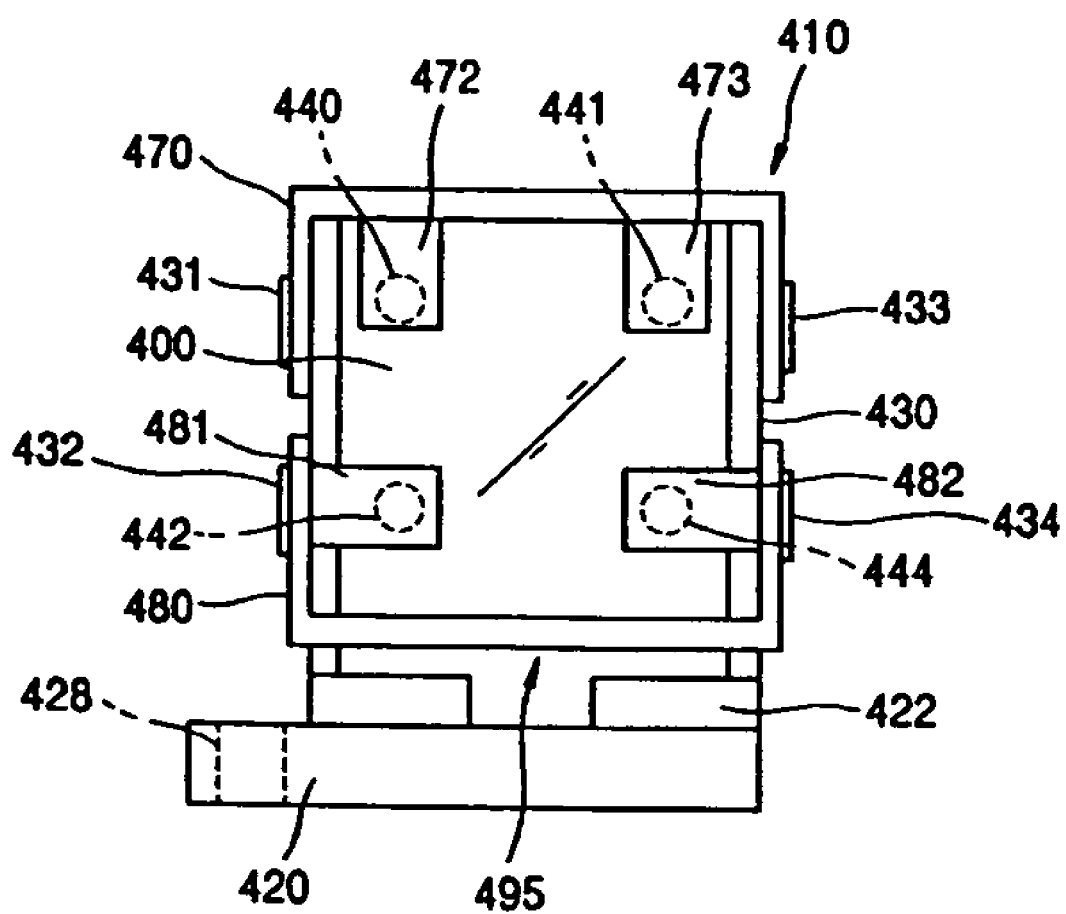
FIG. 13 is an assembled front view illustrating the mirror support device of FIG. 12.

FIG. 12 is an exploded perspective view illustrating a mirror support device according to another embodiment of the present general inventive concept, and FIG. 13 is an assembled front view illustrating the mirror support device of FIG. 12

Referring to FIGS. 12 and 13, the mirror support device includes a mirror 400, a holder 410, an elastic clasp 495, and a mirror aligning part.

The mirror 400 reflects an incident light. The mirror 400 includes a length 401 and a width 402. The holder 410 includes a base 420 to support the mirror 300 and a vertical wall 430 disposed at a side of the base 420 to face the mirror 400.

The base 420 includes guides 422 with predetermined heights to confine a movement of a lower portion of the mirror 400 within a predetermined range. The guides 422 may be located such that a distance between the vertical wall 430 and the guides 422 is larger than the width 402 of the mirror 400, and a distance between the guides 422 is substantially equal to the length 402 of the mirror 400. Accordingly, the guides 422 can confine forward and backward movements (denoted by arrow "F") of the mirror 400.

Figure 14:
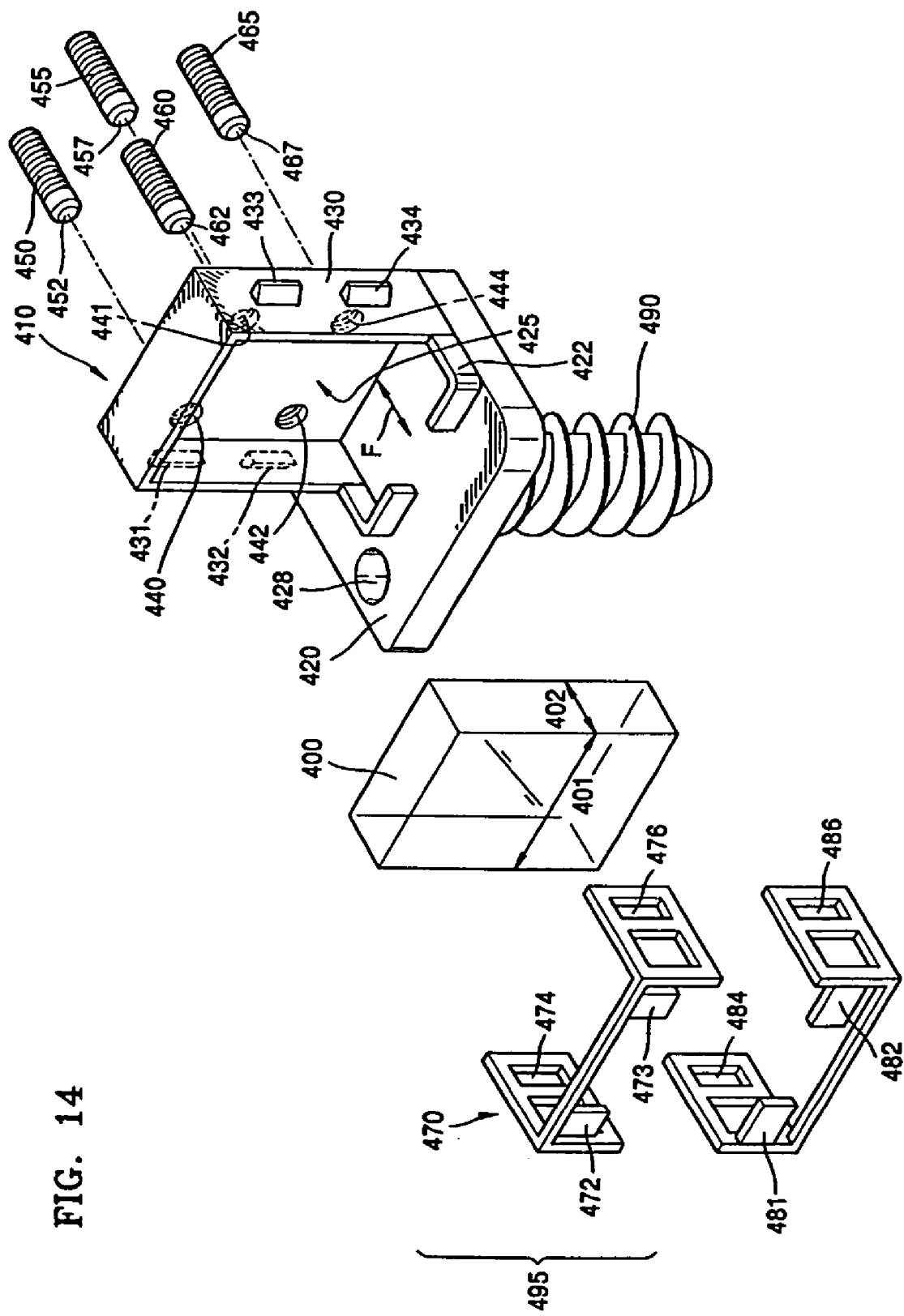
FIG. 14 is an exploded perspective view illustrating a mirror support device according to another embodiment of the present general inventive concept.

A guide hole 428 can be provided in the base 420. The guide hole 428 can be used to adjust a horizontal rotation of the holder 410. A pin (not shown) can be inserted into the guide hole 428 when the holder 410 needs to be rotated by a large amount. Also, a worm 490 (see FIG. 14) may be installed on the bottom of the base 420 to adjust the horizontal rotation of the holder 410. FIG. 14 illustrates a mirror support device employing the worm 490 according to another embodiment of the present general inventive concept. The mirror support device of FIG. 14 is substantially similar to the mirror support device of FIG. 12, except for the worm 490. The worm 490 may be used with a worm gear (worm wheel, not shown). This worm gearset (i.e., the worm 490 and the worm gear) is suitable to rotate a mirror of a high-sensitive optical device because of a smooth rotational structure and a large speed reduction ratio thereof. The employment of the worm gearset, as illustrated in FIG. 14, does not limit the spirit and scope of the present general inventive concept.

The mirror aligning part is arranged at the vertical wall 430 with a predetermined pattern. The mirror aligning part contacts the mirror 400 to adjust an orientation of the mirror 400. The mirror aligning part may include first aligning members 450 and 455 and second aligning members 460 and 465. The first aligning members 450 and 455 may be abutted on upper portions of the mirror 400 to align the mirror 400, and the second aligning members 460 and 465 may be abutted on lower portions of the mirror 400 to align the mirror 400. The first aligning members 450 and 455 can be moved forward and backward to tilt and swivel the mirror 400 to adjust the orientation of the mirror 400 in left, right, up and down directions. The second aligning members 460 and 465 can be used to swivel the mirror 400 to precisely adjust the orientation of the mirror in left and right directions.

The first and second aligning members 450, 455, 460, and 465 can respectively include contact surfaces 452, 457, 462, and 467 at ends thereof. The contact surfaces 452, 457, 462, and 467 contact the mirror 400. When the aligning members 450, 455, 460, and 465 are moved, forces are applied to the mirror 400 from the contact surfaces 452, 457, 462, and 467 to tilt and swivel the mirror 400.

The vertical wall 430 includes aligning holes 440, 441, 442, 444 formed therein into which the first and second aligning members 450, 455, 460, and 465 can be respectively inserted.

The vertical wall 430 can also include a mirror receiving portion 425 with a predetermined height to accommodate the mirror 400. The movement of the mirror 400 is confined within the mirror receiving portion 425. The holder 410 can include a plurality of coupling protrusions 431, 432, 433, and 434 at opposite sides thereof. The coupling protrusions 431, 432, 433, and 434 can be aligned with the elastic clasp 495.

The elastic clasp 495 can include a first elastic member 470 and a second elastic member 480 to elastically fasten the mirror 400 to the holder 410. The first elastic member 470 can include coupling holes 474 and 476 into which the coupling protrusions 431 and 433 can be inserted. The first elastic member 470 biases an upper portion of the mirror 400 toward the vertical wall 430 where the first aligning members 450 and 455 are located. The first elastic member 470 may include first pressing portions 472 and 473 aligned with the first aligning members 450 and 455 to tightly fasten the mirror 300 against the first aligning members 450 and 455.

The second elastic member 480 can include coupling holes 484 and 486 in which the coupling protrusions 432 and 434 can be inserted. The second elastic member 480 biases the lower portion of the mirror 400 toward the vertical wall 430 where the second aligning members 460 and 465 are located. The second elastic member 480 may include second pressing portions 481 and 482 aligned with the second aligning members 460 and 465 to tightly fasten the mirror 400 against the second aligning members 460 and 465.

As illustrated in FIG. 12, two coupling holes 474, 476, 484, and 486 are provided in each of the first and second elastic members 470 and 480 to stably and securely fasten the mirror 400 to the holder 410, however a number of coupling holes is not limited thereto.

The first and second elastic members 470 and 480 can be independently attached to the holder 410, such that the first and second elastic members can independently react against the aligning actions of the first and second aligning members 450, 455, 460, and 465. The elastic clasp 495 may be a leaf spring.

When the mirror 400 is installed in the mirror support, the mirror 400 is inserted in the mirror receiving portion 425, the coupling holes 474 and 476 of the first elastic member 470 are coupled with the coupling protrusions 431 and 433 of the holder 410, and the coupling holes 484 and 486 of the second elastic member 480 are coupled with the coupling protrusions 432 and 434 of the holder 410. Moving the first aligning members 450 and 455 in forward and backward directions causes the mirror 400 to tilt and swivel. That is, the mirror 400 tilts and swivel as the first aligning members 450 and 455 move forward and backward, such that the orientation of the mirror 400 can be adjusted in left, right, up and down directions using the first aligning members 450 and 455. The first pressing portions 472 and 473 support the mirror 400 against the forward and backward movements of the first aligning members 450 and 455, such that an undesired deviation of the mirror 400 can be prevented during the tilting and swiveling movements of the mirror 400.

Moving the second aligning members 460 and 465 in forward and backward directions causes the mirror 400 to swivel precisely. That is, the mirror 400 swivels right and left as the second members 460 and 465 move forward and backward, such that the orientation of the mirror 400 can be adjusted in right and left directions using the second aligning members 460 and 465. The second pressing portions 481 and 482 support the mirror 400 against the forward and backward movements of the second aligning members 460 and 465, such that an undesired deviation of the mirror 400 can be prevented during the swiveling movement of the mirror 400. When it is required to rotate the mirror 400 largely, the guide hole 428 can be used. As described above, the mirror support device according to the embodiment of FIGS. 12 and 13 is designed to precisely point the mirror toward left, right, up, and down directions, such that a light beam can be directed to a desired location in an optical system with a long optical path.

According to various embodiments of the present general inventive concept, a mirror of an optical system can be easily oriented to left, right, up, and down directions with a mirror support device. That is, the mirror support device easily orients the mirror toward left, right, up, and down directions, such that a light beam can be easily directed to a desired location in the optical system.

As described above, a mirror support device and an optical scanning apparatus adopting the same, according to various embodiments of the present general inventive concept, is designed such that a mirror of an optical system can be easily oriented to left and right directions as well as up and down directions. Further, coupling protrusions of a holder are aligned with coupling holes of an elastic clasp, such that the mirror can be stably oriented and accommodated in the holder. Furthermore, aligning portions are properly arranged such that the upward/downward alignment and left/right alignment of the mirror can be independently carried out, thereby aligning the mirror more stably. Accordingly, a mirror support device and an optical scanning apparatus adopting the same, according to various embodiments of the present general inventive concept, are capable of orienting a mirror to a desired location stably and independently, thereby increasing an image quality of an optical system. Also, a simple structure of a mirror support device according to various embodiments of the present general inventive concept increases productivity.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A mirror support device comprising:
a mirror having a mirror surface;
a holder on which the mirror is mounted, the holder including a base to support the mirror and a vertical wall disposed at a side of the base to face the mirror;
an elastic clasp to elastically urge the mirror toward the vertical wall; and
a mirror aligning part having at least two movable aligning members arranged at the vertical wall with a predetermined pattern to push the mirror at a plurality of points to adjust an orientation of the mirror.

2. The mirror support device of claim 1, wherein the mirror aligning part comprises:
a first aligning portion and a second aligning portion arranged a predetermined distance apart from each other in a horizontal direction; and
a third aligning portion spaced apart from the second aligning portion in a vertical direction.

3. The mirror support device of claim 2, wherein each of the first and third aligning portions comprises:
an aligning hole formed through the vertical wall; and
an aligning member movable in the aligning hole in forward and backward directions to adjust the orientation of the mirror.

4. The mirror support device of claim 3, wherein the aligning hole comprises a screw hole, and the aligning member comprises a male screw.

5. The mirror support device of claim 3, wherein the second aligning portion comprises a projection projecting toward the mirror to abut against the mirror.

6. The mirror support device of claim 5, wherein the projection is in point-contact with the mirror.

7. The mirror support device of claim 6, wherein the projection has a hemisphere shape.

8. The mirror support device of claim 5, wherein the elastic clasp comprises a mirror pressing part located corresponding to the mirror aligning part, and the mirror pressing part comprises at least one protruded pressing portion to press the mirror toward the vertical wall.

9. The mirror support device of claim 8, wherein the at least one pressing portion comprises:
a first pressing portion aligned with an imaginary horizontal line connecting the first and second aligning portions to press the mirror toward the vertical wall; and
a second pressing portion aligned with an imaginary vertical line connecting the second and third aligning portions to press the mirror toward the vertical wall.

10. The mirror support device of claim 9, wherein the elastic clasp is made of stainless steel.

11. The mirror support device of claim 9, wherein the first and second aligning portions are abutted against lower portions of the mirror, and the third aligning portion is abutted against an upper portion of the mirror.

12. The mirror support device of claim 9, wherein the first and second aligning portions are abutted against upper portions of the mirror, and the third aligning portion is abutted against a lower portion of the mirror.

13. The mirror support device of claim 12, wherein the holder includes a plurality of coupling protrusions to be coupled with the elastic clasp.

14. The mirror support device of claim 3, wherein the second aligning portion comprises:
an aligning hole formed through the vertical wall; and
an aligning member movable in the aligning hole in the forward and backward directions to adjust the orientation of the mirror.

15. An optical scanning unit comprising:
a mirror support device in which a mirror having a mirror surface is installed to reflect light to a predetermined location, the mirror support device including:
a holder on which the mirror is mounted, the holder having a base to support the mirror and a vertical wall disposed at a side of the base to face the mirror;
an elastic clasp to elastically urge the mirror toward the vertical wall; and
a mirror aligning part having at least two movable aligning members arranged at the vertical wall with a predetermined pattern to push the mirror at a plurality of points to adjust an orientation of the mirror.

16. The optical scanning apparatus of claim 15, wherein the mirror aligning part includes:
a first aligning portion and a second aligning portion that are horizontally arranged a predetermined distance apart from each other; and
a third aligning portion spaced apart from the second aligning portion in a vertical direction.

17. The optical scanning apparatus of claim 16, wherein each of the first and third aligning portions includes:

an aligning hole defined through the vertical wall; and an aligning member movable in the aligning hole in forward and backward directions to adjust the orientation of the mirror.

18. The optical scanning apparatus of claim 17, wherein the second aligning portion includes a projection projecting toward the mirror to abut against the mirror.

19. The optical scanning apparatus of claim 18, wherein the elastic clasp includes a mirror pressing part located corresponding to the mirror aligning part, the mirror pressing part having at least one protruded pressing portion to press the mirror toward the vertical wall.

20. The optical scanning apparatus of claim 19, wherein the pressing portion includes:
   a first pressing portion aligned with an imaginary horizontal line connecting the first and second aligning portions to press the mirror toward the vertical wall; and
   a second pressing portion aligned with an imaginary vertical line connecting the second and third aligning portions to press the mirror toward the vertical wall.

21. The optical scanning apparatus of claim 20, wherein the first and second aligning portions are abutted against lower portions of the mirror, the third aligning portion is abutted against an upper portion of the mirror, and the holder includes a plurality of coupling protrusions to be coupled with the elastic clasp.

22. The mirror support device of claim 1, wherein the elastic clasp clasps to the vertical wall.

23. The mirror support device of claim 1, wherein the mirror alignment unit adjusts the mirror in at least two directions 24. The mirror support device of claim 1, wherein the base comprises a plurality of guides to confine a movement of a lower portion of the mirror to a predetermined range.

25. The mirror support device of claim 1, where the elastic clasp comprises at least two pressing portions to press the mirror at a position corresponding to a mid point in a line connecting the points of the at least two movable aligning members.

* * * * *